May 9, 1967 D. B. LANE 3,318,570
BLEEDER VALVES
Filed Dec. 18, 1963
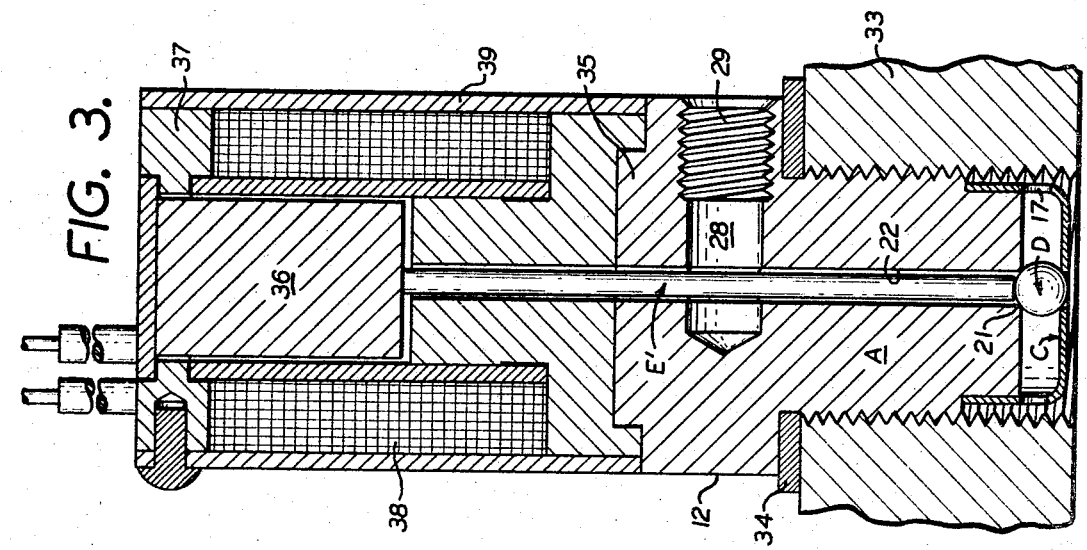
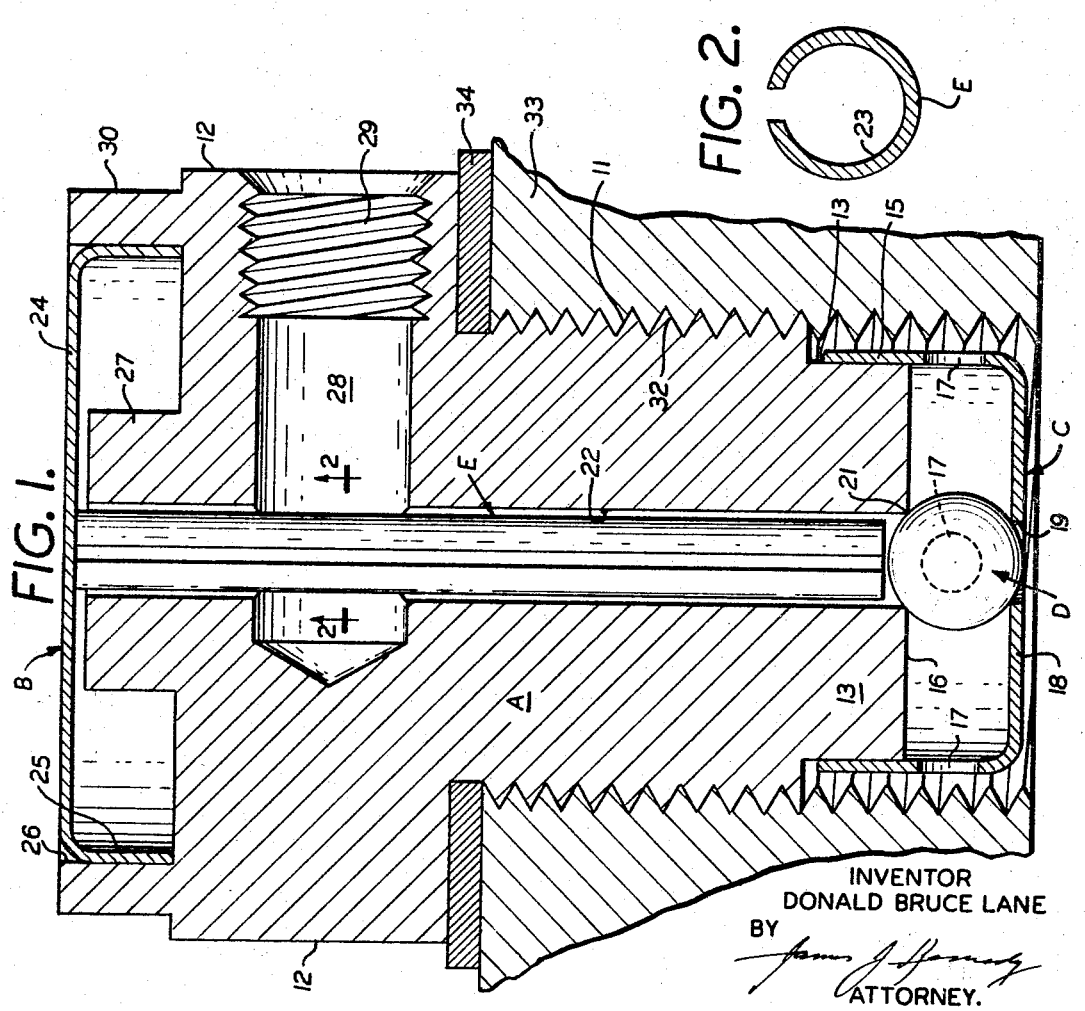
INVENTOR
DONALD BRUCE LANE
BY
ATTORNEY.

United States Patent Office 3,318,570
Patented May 9, 1967

3,318,570
BLEEDER VALVES
Donald Bruce Lane, 25 N. Court, North Park,
Roslyn Heights, N.Y. 11577
Filed Dec. 18, 1963, Ser. No. 332,337
3 Claims. (Cl. 251—321)

This invention relates to improvements in bleeder valves for hydraulic systems.

In general, the presence of a compressible fluid, such as air, in a hydraulic system operated by an incompressible fluid, such as oil, is highly undesirable. The presence of incompressible fluid in a compressible fluid system may also impair the operation, as, for example, clogging of valves by accumulated lubricating oil or condensation in a compressed air system. It is, therefore, general practice in hydraulic systems to provide pockets at upper or lower points in the system (depending on whether the undesired fluid is the gas or the liquid) for collecting the undesired fluid, together with bleeder valves for withdrawing the fluid collected in the pockets.

The bleeder valves now in common use are mostly wrench operated, requiring special wrenches in locations where access is difficult and preventing their use in some locations where bleeding would be desirable. Unless the design is unduly complex, heavy and expensive, the valves are easily subject to damage by excessive tightening and to leakage due to insufficient tightening.

Previous Patent 2,893,683, granted July 7, 1959, discloses a bleeder valve operable by a screw driver or other blade and eliminating likelihood of damage or leakage due to excessive or insufficient tightening.

One object of the present invention is to provide a bleeder valve of simplified construction, permitting a marked reduction in cost.

A second object is to provide a valve requiring no tool whatever for operating it.

A further object is to provide a valve which combines in a simple, reliable manner with remote operating mechanisms, such as a solenoid actuating device.

Still another object is to provide a valve with definite open and closed positions and which returns automatically to closed position.

A valve embodying the invention in a preferred form will now be described with reference to the accompanying drawing, and the features forming the invention will then be pointed out in the appended claims.

In the drawing:

FIG. 1 is an enlarged axial section of the bleeder valve of the invention;

FIG. 2 is a detail section of an element of the valve of FIG. 1;

FIG. 3 is a view similar to FIG. 1 but on a smaller scale, showing the valve as combined with a solenoid operating element.

The valve parts comprise a plug A, outer diaphragm cap B, inner spring cap C, ball valve body D and valve operating rod E. The spring cap C normally holds the ball D in valve closing position, and pressure on the diaphragm cap B operates the rod E to unseat the ball D for bleeding fluid as required.

This plug A includes a threaded stem portion 11 and a head 12 which is preferably formed as a nut, for operation by a wrench. Below the threaded section 11, the body has a cylindrical reduced section 13 to which is fitted the cup-shaped cap C which has a cylindrical portion or skirt 15 which fits the reduced section 13 and is provided, below the end 16 of the plug A, with openings 17 for freely admitting hydraulic fluid and trapped air (or pneumatic fluid and trapped liquid) to the interior of the cap C. The end wall 18 of cap C has a central circular aperture 19 in which sits the ball D which serves as the valving element and which engages against the valve opening 21 in the surface 16, formed by axial bore 22 in the plug A.

The valve operating member takes the form of a tubular split rod E positioned within and having a length not greater and preferably less than that of the bore 22 and extending up through the plug A to the flat central diaphragm portion 24 of the outer cap member B, the skirt 25 of which fits into and against the wall 26 of a cylindrical recess formed in the top of the plug member A. Within this recess and immediately surrounding the bore 22 and rod E is a boss 27 normally spaced somewhat from the diaphragm 24, as shown in the drawing. A cross-bore 28 connects bore 22 to the exterior of the member A. This bore may terminate in a threaded section 29 for receiving a fitting coupling it to a discharge line or may simply vent freely to atmosphere, depending upon the requirements of the individual installation.

It will be noted that the cap C is of a smaller diameter than that of the cap B whereby the elasticity of the central diaphragm portion 24 of the cap B is greater tran that of the central part 18 of the cap C. This relationship is desirable for if there is a tolerance build up during manufacture which results in the rod E engaging both the ball D and the diaphragm portion 24, the cap C will still maintain the ball D against the valve seat 21 causing a slight bulge in the diaphragm 24. This same result may be obtained where the caps B and C are of the same diameter or even when cap C is of greater diameter than cap B, provided, of course, that the thicknesses of the material and/or the material itself from which each is made is such that the elasticity of the diaphragm portion 24 is greater than that of the central part 18.

The valve is installed by screwing the threaded stem 11 into correspondingly threaded bore 32 in the wall 33 of the hydraulic system, washer 34 being provided to seal the joint between plug A and the wall 33.

Apertures 17 are preferably spaced somewhat below the end 16 of the plug A, permitting trapped gas to collect above these apertures and below the end 16 of the plug, when the bleeder valve is used in the position of the figure, and also permitting liquid to be bled to collect at this point when the valve is used in the inverted position for bleeding liquid from a pneumatic system.

The valve mechanism as shown in FIG. 1 may be operated manually in a very simple manner by simply pressing down on the diaphragm 24, which pushes rod E down against the ball D unseating it from the valve seat 21 and permitting fluid at that point to escape up the bore 22 through and around tubular rod E and thus out through the cross-bore 28. Movement of the diaphragm 24 in the valve opening direction is limited by the boss 27 which acts as a stop, and because the rod E is preferably shorter than the bore 22, movement of the ball D in the valve opening direction is, in turn, limited thereby permitting the use of a press-fitted cap for yieldably holding the ball D against the valve seat 21.

The valve may be made in a variety of sizes to suit particular requirements. In one typical size, the ball D may be about ⅛ inch in diameter and the other parts in the proportion indicated, the pitch diameter of the screw threaded section 11 and the bore 32 being .4 inch. The cap elements B and C may be stamped out of corrosion resistant steel of suitable thickness, such as .005 inch sheet, and require no finish treatment. Element B is made with an O.D. from .001 to .003 inch larger than the I.D. of the recess wall 26 so as to press fit into the same, and the inner cap element C is made with an I.D. from .001 to .003 inch smaller than that of the cylindrical reduced section 13, so as to press fit thereon.

These elements are assembled to the body A by simply press fitting into place and ordinarily require no other attachment. It will be observed that the hydraulic forces on the cap C axially of the body member A are balanced, so that there are no pressure forces tending to dislodge this element and similar conditions obtain as to the diaphragm B which is subjected to atmospheric pressure on both sides. In cases where additional attachment may be required, plastic cement is found entirely adequate for holding the press fitted elements in place against any vibration or other forces which may be encountered.

The stroke of member E may be of the order of only 1/16 of an inch and, due to the axial looseness of pin E, the unseating movement of ball D may be even less, so that the elasticity of the central part 18 of the cup-shaped inner element C is entirely adequate to permit the required movement of the ball without any tendency to dislodge the press fitted member C. The force required to operate the valve is small and is readily exerted manually by the thumb or by a solenoid of very small dimensions, as indicated in FIG. 3.

Where the valve is used for remote operation, as shown in FIG. 3, the outer cap B may be omitted, and the outer end of the plug body A may take the form of a flat ended reduced cylindrical portion 35, as shown. The operating rod E′ is similar to the element E previously described but is elongated so as to reach the solenoid slug 36. The solenoid core 37 and winding 38 are enclosed in soft iron case 39 forming part of the magnetic circuit and the core 37 fits the upper end of the plug body A as shown, being brazed to the cylindrical surface of the reduced portion 35. The slug 36 has only a limited movement until it encounters the core body 37, and because the rod E′ is shorter than the combined length of the bore in the plug body A and the core 37, movement of the ball D in the valve opening direction is, in turn, limited. The solenoid ordinarily requires no return spring, the force exerted by cap C against ball D being sufficient for this purpose when the solenoid is not energized.

What is claimed is:

1. A bleeder valve comprising a plug having an axial bore defining a valve seat at the inner end of the plug and a cross-bore communicating with the axial bore for discharging bled fluid, an inner apertured spring cap press-fitted to the inner end the plug, a ball yieldably held by the said inner cap against the said seat, a valve operating rod in the said axial bore, and an outer cap member, press-fitted to the outer end of the plug, having a central axially movable diaphragm portion engageable with the said rod for forcing the same axially to unseat the ball so as to permit discharge of fluid, said diaphragm portion of said outer cap member being of greater elasticity than said spring cap.

2. A bleeder valve according to claim 1, in which the outer end of the plug engages the said outer cap member peripherally to hold the same against axial movement in the valve opening direction, and also has a central portion normally spaced from the said outer cap member for limiting movement thereof in the valve opening direction.

3. A bleeder valve according to claim 1, in which the said inner apertured spring cap has a central opening for seating the said ball and peripheral openings for permitting passage of fluid, the said peripheral openings being spaced from the inner end of the plug to define a pocket for trapped fluid.

References Cited by the Examiner

UNITED STATES PATENTS

| | | | |
|---|---|---|---|
| 834,626 | 10/1906 | Longacre | 251—129 X |
| 988,080 | 3/1911 | Cook. | |
| 2,734,712 | 2/1956 | Fraser | 251—40 X |
| 2,868,494 | 1/1959 | Kearns et al. | 251—129 X |

FOREIGN PATENTS 917,287   8/1954   Germany.

M. CARY NELSON, *Primary Examiner.*

R. MILLER, *Assistant Examiner.*